United States Patent
Hawkins et al.

(10) Patent No.: US 7,934,058 B2
(45) Date of Patent: Apr. 26, 2011

(54) PREDICTIVE CACHING OF ASSETS TO IMPROVE LEVEL LOAD TIME ON A GAME CONSOLE

(75) Inventors: Dax H. Hawkins, Kirkland, WA (US); Jeffrey R. Bernhardt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/639,717

(22) Filed: Dec. 14, 2006

(65) Prior Publication Data
US 2008/0147971 A1 Jun. 19, 2008

(51) Int. Cl.
*G06F 13/38* (2006.01)
(52) U.S. Cl. ......................................................... 711/137
(58) Field of Classification Search .................. None
See application file for complete search history.

(56) References Cited

U.S. PATENT DOCUMENTS

| | | | | |
|---|---|---|---|---|
| 5,990,902 A | 11/1999 | Park | ............................... | 345/430 |
| 6,195,622 B1* | 2/2001 | Altschuler et al. | ................. | 703/2 |
| 6,433,789 B1 | 8/2002 | Rosman | .......................... | 345/582 |
| 6,640,284 B1 | 10/2003 | Shaw et al. | .................... | 711/129 |
| 6,643,744 B1 | 11/2003 | Cheng | ............................ | 711/137 |
| 6,717,577 B1 | 4/2004 | Cheng et al. | .................... | 345/419 |
| 6,801,203 B1 | 10/2004 | Hussain | .......................... | 345/506 |
| 6,891,546 B1 | 5/2005 | Park et al. | ...................... | 345/552 |
| 6,931,494 B2 | 8/2005 | So et al. | ........................ | 711/137 |
| 6,986,018 B2 | 1/2006 | O'Rourke | ...................... | 711/213 |
| 7,130,890 B1* | 10/2006 | Kumar et al. | .................. | 709/218 |
| 7,246,203 B2* | 7/2007 | Moat et al. | ..................... | 711/133 |
| 2003/0195940 A1* | 10/2003 | Basu et al. | ..................... | 709/213 |
| 2005/0223165 A1* | 10/2005 | Schmidt et al. | ................ | 711/113 |
| 2005/0282636 A1* | 12/2005 | O'Brien | ........................... | 463/42 |
| 2006/0090031 A1* | 4/2006 | Kirshenbaum et al. | ........ | 711/113 |
| 2006/0190688 A1 | 8/2006 | Van Eijndhoven et al. | ... | 711/137 |
| 2007/0094325 A1* | 4/2007 | Ih et al. | ........................... | 709/203 |
| 2007/0179854 A1* | 8/2007 | Ziv et al. | .......................... | 705/14 |
| 2008/0104101 A1* | 5/2008 | Kirshenbaum et al. | ........ | 707/102 |

OTHER PUBLICATIONS

Brun, J. et al., "Managing Latency Networked Games", *Communications of the ACM*, Nov. 2006, 49(11), 46-51, http://delivery.acm.org.

Chan, A. et al., "Motion Prediction for Caching and Prefetching in Mouse-Driven DVE Navigation", *ACM Transactions on Internet Technology*, Feb. 2005, 5(1), 70-91, http://delivery.acm.org.

Igehy, H. et al., "Prefetching in a Texture Cache Architecture", http://graphics.stanford.edu, 11 pages, ACM, 1998 workshop on graphics hardware Lisbon Portugal.

\* cited by examiner

*Primary Examiner* — Duc T Doan
(74) *Attorney, Agent, or Firm* — Woodcock Washburn LLP

(57) ABSTRACT

A predictive model is used to populate a cache in a videogame system. The predictive model takes as an input a sequence of file sections that have been requested for the associated videogame thus far. The predictive model then returns the names or indicators of one or more file sections that will likely be requested in the future along with a probability that those file sections will be requested. A cache driver executing in the background of the videogame system may then use the predictive model to reduced load times during the execution of a videogame by retrieving the predicted file sections from the optical disk and placing them in a cache during periods of low CPU activity.

19 Claims, 4 Drawing Sheets

PREDICTIVE CACHING OF ASSETS TO IMPROVE LEVEL LOAD TIME ON A GAME CONSOLE

BACKGROUND

For the current generation of videogame consoles, games are distributed and stored on optical disks or on a network location. Most game titles have art assets such as sound files, images, videos, map "levels", character models, etc that are stored on these disks or remote network. The typical size for these assets is in the 4 to 6 GB range. As such, all of the assets for a game will not fit into the amount of RAM typically associated with a game console resulting in games with multiple "levels", e.g. areas, maps, missions, matches or other logical ways of dividing the game play into sections. When a game transitions between levels, the assets for the new level must be read from the optical disk into RAM. Because of the high latency of reading data from an optical disk or from the network, many games and users experience painful long pauses or "load times" during these transitions.

The latency of reading data from a hard drive is lower than reading from an optical drive and reading from RAM is much faster than reading from a hard drive. If assets are loaded from the optical disk or network into one of these lower latency locations before they are needed, then the level load time can be substantially reduced.

Typically, in non gaming systems, a cache is used to reduce the load time associated with optical disks. When a software application is executed on the optical disk, a cache is created in the RAM or hard drive. When data is requested from the optical disk, the system first checks the cache for the requested data. If the data is in the cache then the data is retrieved from the cache rather than the optical disk, otherwise the data is requested from the optical disk and then stored in the cache. If the cache is full, then the newly requested data is substituted for some piece of data that has not be requested for the longest amount of time. This type of caching is known as most recently used.

Because data that is read recently is likely to be read again in software applications, this method of caching is very effective. However, because videogames are largely user-directed, they generally do not lend themselves to this most recently used caching scheme. Often decisions that are made by the player will lead down a predictable path which leads to future decision points. As a result, once a set of assets have been loaded and used, they may not be needed again for some time, if ever, making traditional caching systems ineffective. For example, if a user completes a level they may be shown a video clip. The video clip is only shown after completion of the associated level and will never be shown again. Thus, a most recently used caching scheme in a videogame would not be useful in this scenario.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A predictive model is created for a videogame by observing the sequences of file section requests that take place during the execution of the particular videogame. The predictive model takes as an input a sequence of file sections that have been requested for the associated videogame thus far. The predictive model then returns the names or indicators of one or more file sections that will likely be requested in the future along with a probability that those file sections will be requested. A cache driver executing in the background of the videogame system may then use the predictive model to reduce load times during the execution of a videogame by retrieving the predicted file sections from an optical disk and placing them in a cache during periods of low CPU activity. Then, when the file sections are actually requested by the videogame system, the driver retrieves them from the cache, avoiding any perceivable delay to the user caused by waiting for the file sections to be retrieved from the optical disk.

DETAILED DESCRIPTION

Figure 1:
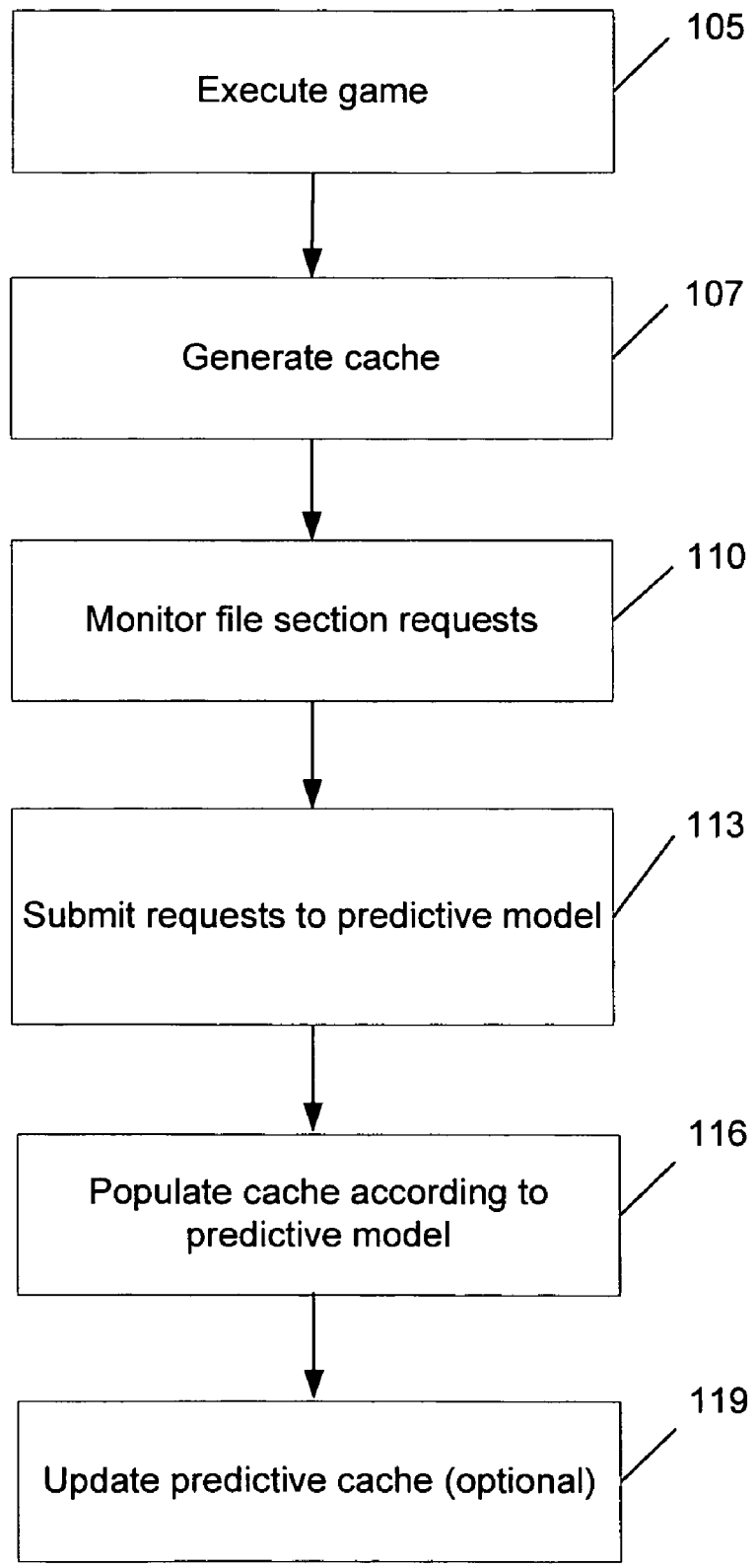
FIG. 1 is an illustration of an exemplary method for predictive caching.

FIG. 1 is an illustrative method for maintaining a predictive cache in a videogame system. At 105, a user may begin executing a videogame. As described above, modern videogames often feature a variety of highly detailed environments and textures. Because of the amount of storage this requires, videogames are often distributed on optical disks which offer a high amount of storage, but also feature high latency. When the videogame is executed portions of the videogame stored on the optical disk are transferred onto a low latency local storage medium (e.g., RAM) as needed. However, the high latency of the optical disk often results in long load times between levels of the videogame as new textures and file sections are moved into the local storage medium. Note that while the following descriptions are directed to videogames stored on optical disks, the invention applies to videogames stored on any medium where latency may be an issue. These include, but are not limited to games stored on the internet or other computer networks, for example.

At 107, a cache may be generated for the videogame. The cache may be stored in a low latency storage medium such as RAM or a hard disk drive. Any system, method, or technique known in the art for generating a cache may be used. The cache may be a fixed size, or may grow in size as needed.

In one embodiment, the existence of the cache is unknown to the creator or developer of the particular videogame. Thus, the cache is desirably created and maintained by the operating system of the videogame system. In this way, the predictive cache can be used to increase the performance of all games played on the system regardless of whether the developers contemplated the use of a predictive cache. In addition, because videogame system often have optional hard drives, or upgradeable RAM, having the cache as a feature of the operating system frees the developer from having to develop separate versions of the game for the various optional configurations.

At 110, the videogame system may begin to monitor file section and data requests to the optical disk. In one embodiment, there may exist a separate driver or background process that monitors the file section requests made by the system thus far, as well as any currently opened files. Any system, method, or technique for monitoring and collecting file data activity may be used.

At 113, the collected file section and data requests are submitted to a predictive model. As described above, typically most recently used caching systems are inadequate for videogames. Thus, the predictive model is instead used to maintain the cache. The predictive model desirably takes as an input the file section and data requests made thus far and returns names or indicators of one or more file sections that are likely to be requested next. In one embodiment, these predicted file sections may also include some calculated probability that the particular file section is likely to be requested. The particular methods used to construct the model are described further with respect to FIG. 2, for example. However, those skilled in the art will appreciate that a large number of statistical methods known in the art are applicable.

At 116, the system may populate the cache according to the data returned by the predictive model. Depending on the size of the cache, the driver or background thread that monitors the file section and data requests may request some or all of the file sections indicated by the predictive model and load them into the cache. In one embodiment, the background thread only loads file sections into the cache that have an associated probability greater than a threshold value. This threshold value may be proportional to the size of the cache, for example. The background thread desirably loads the file sections from the optical disk to the cache during a period of low CPU usage so as to not interfere with the user's game experience.

At 119, the predictive model may be optionally updated based on a comparison between the actual file sections requested during game play and the file sections predicted by the predictive model. Because the cache is only effective when the predictive model is accurate, it may be desirable to continuously update the statistical model used to predict file section requests with new data. Those skilled in the art will appreciate that the particular methods used to update the predictive model may depend on the underlying statistical methods used to create the model.

In addition, how, or if, the predictive model is updated will depend on how the predictive model is stored. In one embodiment, the predictive model may be generated by a game developer before shipping to the users and stored directly on the optical disk. Typically, optical disks are not writable, therefore the predictive model will either be static, or first moved to a writable storage medium before updating.

In another embodiment, the predictive model is generated as the user plays. In this embodiment the predictive model will be stored either locally at the user's game console, or online in a storage associated with the user.

In another embodiment, the predictive model is generated by aggregating data collected from a variety of users playing the associated videogame. In this embodiment, the user may periodically upload file section data, or an actual predictive model, to a centralized location. This predictive model or file section data may then be aggregated with previously generated predictive models from a variety of users to create a global predictive model. This global predictive model may then be downloaded and utilized by the various users of the particular videogame.

Figure 2:
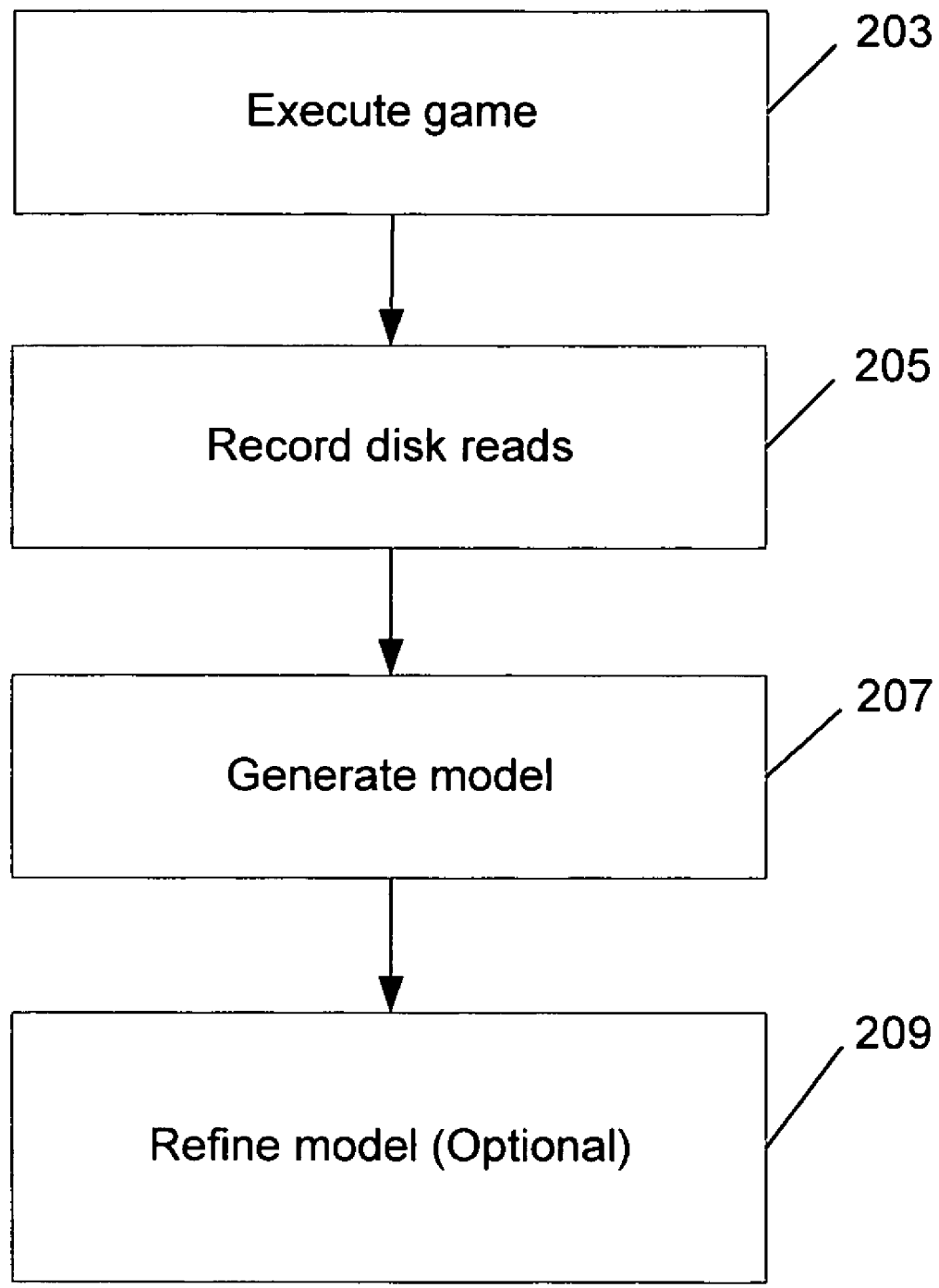
FIG. 2 is an illustration of an exemplary method for generating a predictive model.

FIG. 2 is an illustration of an exemplary method for generating a predictive model. At 203, the game is executed in the videogame console, or some computer system capable of executing the particular videogame. In one embodiment, the predictive model is pre-generated. That is, the predictive model for the particular game is created before the user receives the videogame, and may actually be distributed on the videogame disk and loaded into the videogame console when a user plays the videogame. Alternatively, the predictive model may be stored remotely and transferred to the user via an online system when the user executes the game.

In another embodiment, the user may generate his or her own predictive model though actual game play. In this case, there may be no pre-generated predictive model associated with the game and the predictive model is actually created and modified based on the user's game experience. The generated model may then be stored for the user either remotely or locally. This stored predictive model may be then used and modified when the user later plays the game.

Alternatively, the user generated predictive model may be aggregated online with one or more other predictive models to generate a global predictive model that can be used by other users of the game. These global models may then be used by all players of the particular game.

At 205, the optical disk reads are recorded by a predictive model generating thread. These reads may be recorded to determine which file sections from the optical disk are being used at a particular time during game play. The predictive model generating thread desirably executes in the background so as to not interfere with the user's game experience. Any system, method, or technique may used for monitoring file section activity.

At 207, the predictive model may be generated using the recorded optical disk reads. The recorded disk reads are desirably analyzed to generate a model that can predict, with an associated probability, what are the likely future disk reads that will likely occur given a history of previously observed disk reads. The predictive model may be generated using a wide variety of statistical methods such as Bayesian statistics or machine learning techniques, for example.

In one embodiment, the predictive model may be constructed using sequence clustering or by a set of Markov chains. Typical systems assign infrequent events very low credibility and may not include them in the model. This is known as feature selection and helps reduce the overall complexity of the model. However, as described above, many files or file sections in a videogame will be requested very infrequently, or only once. Therefore, feature selection is not appropriate for use in the predictive model. Rather, the predictive model is desirably "over-fit" or trained to match all of the events or collected file section data.

At 209, the predictive model may be optionally refined by continuing to monitor disk reads and file section requests and comparing them to the predicted disk reads and file section requests. If the predictive model is being generated by the game developer it may be desirable to have one or more additional users play the game using the generated predictive model and compare their actual results with those predicted by the predictive model. If necessary, the predictive model may be retrained with the additional data. Similarly, if a user generated their own predictive model it may be desirable to periodically update the model using data more recently collected from the user.

Figure 3:
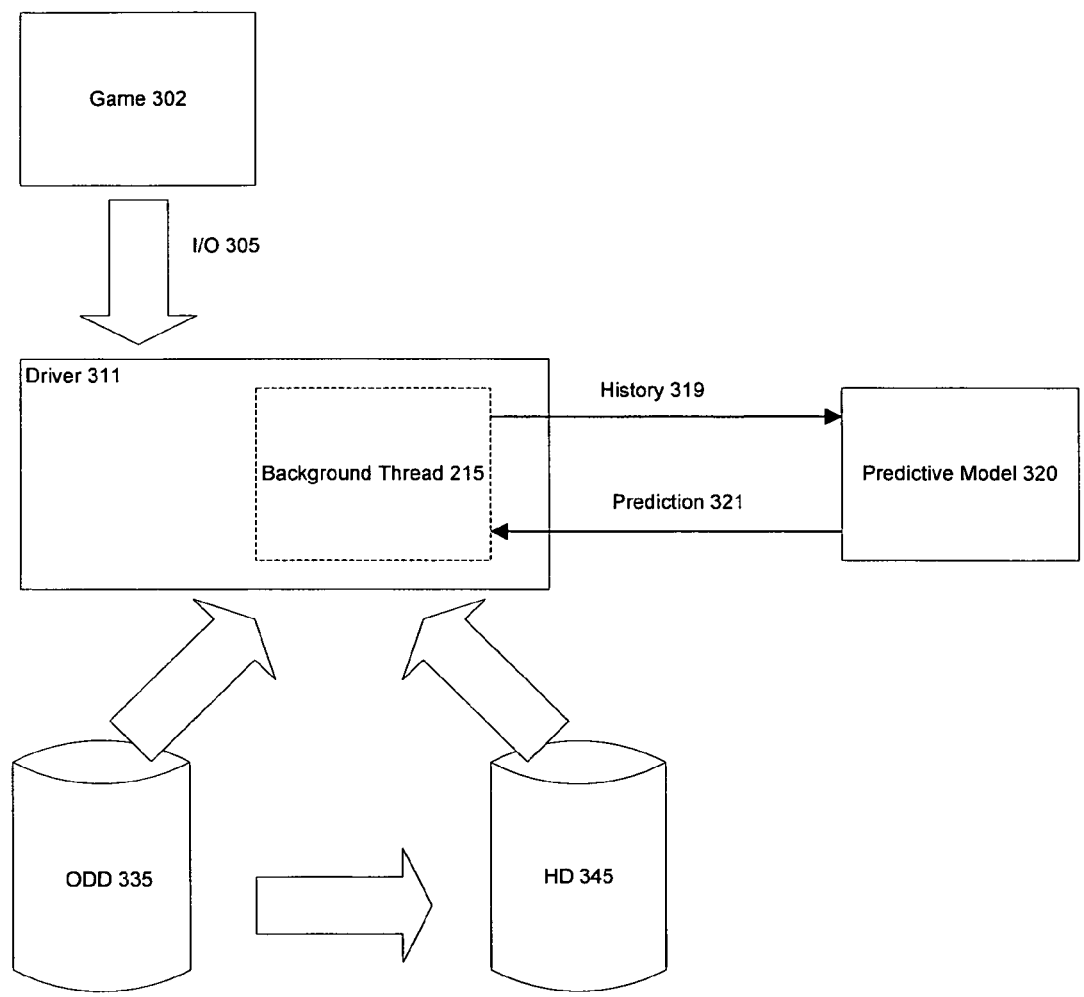
FIG. 3 is an illustration of an exemplary system for predictive caching.

FIG. 3 is an illustration of an exemplary predictive caching system. The system desirably includes several components, each of which may be performed using software, hardware, or some combination of both. While the following description may describe a particular component as either software or hardware, it is for descriptive purposes only and not meant to limit the particular component to hardware or software.

Game 302 is desirably a videogame software application executing on a videogame system. The game may be stored on some type of computer-readable medium, such as ODD 335, where ODD is an acronym for optical disk drive. In one embodiment it is contemplated that ODD 335 be an optical medium such as a DVD, CD, HD-DVD, or Blueray disk. However, the ODD 335 may also be a network location such as the internet, for example.

The game 302 is interfaced with the driver 311 through the I/O 305. The driver 311 executes on the videogame system and controls the data that is read from, and written to, the predictive cache. The predictive cache may be stored on the HD 345. The HD 345 may comprise a hard disk drive, RAM, or other low latency storage medium.

The driver 311 monitors all file section requests from the game 302 to the ODD 335. The background thread 315 receives and collects these requests and forwards them to the predictive model 320 as the history 319. The predictive model 320 then uses the history 319 to generate a set of predictions of future likely file section requests. These predictions are desirably returned to the background thread 315 as the prediction 321.

In one embodiment, the predictive model 320 is generated by observing file section requests for a fixed period of time and then statistically analyzing those observed file section requests to create a statistical model that can then be used to predict future file section requests with an associated probability. Any statistical method for generating predictive models known in the art may be used.

In another embodiment, the developers themselves may direct the predictive model by inserting tags or markers into the file sections comprising the game 302. These tags may list the file sections that are likely to be requested after the game has progressed to the point where the particular tag has been inserted. Thus, in this scenario, when the predictive is queried with the history 319, the tags contained in the file section making up the history 319 are examined and are used by the predictive model 320 to generate the prediction 321.

Where the developers generate the predictive model using tags, the model may be further to refined to accept an indicator of how far in the future to generate predictions. For example, given the section or place in the videogame the user is at, the predictive model may initially read the tags to determine the files sections corresponding to the places or sections that are immediately available to the user from the current level. These sections can be thought of as a first level of prediction. A second level of prediction may comprise the file sections corresponding to the places that are available to the user starting from the first level, and so forth. Thus, the particular file sections predicted by the predictive model would depend on the level of prediction selected for the particular game. This level may depend on the particular medium containing the videogame and the size of the cache. For example, where the medium is a very high latency medium, such as the internet, it may be desirable to set the level high. Similarly, where the available cache is very large it may also be desirable to set the level high to take advantage of the available space.

The driver 311 may then receive the prediction 321 from the background thread 315. The driver 311 may then use the prediction 321 to populate the cache located in HD 345. In one embodiment the driver 311 places all the file sections corresponding to the prediction 321 in the cache. In another embodiment, each prediction in the prediction 321 has an associated probability and the driver 311 only places file sections in the cache that have a probability greater than a threshold. The threshold may be predefined, or be a function of the amount of space available in the cache, for example.

When the driver 311 places one or more of the predicted file sections in the cache it may have to remove file sections previously placed. In one embodiment, the file sections in the cache that have been access are removed first. In another embodiment, each entry in the cache may have a time associated with it corresponding to when it was placed in the cache. File sections with the earliest date are then deleted from the cache first.

In one embodiment, each file section added to the cache may be assigned a counter. Each time a file section in the cache is predicted by the predictive model, its counter may be incremented. When the file section is actually requested by the game, the counter may then be decremented. If a file section has a counter than is zero, or less, then that file section may be overwritten in the cache if space is needed. If space is needed in cache and there are no file sections with zero counters, then either the file section with the lowest counter, or the file section that has been in the cache the longest may be replaced.

Exemplary Computing Arrangement

Figure 4:
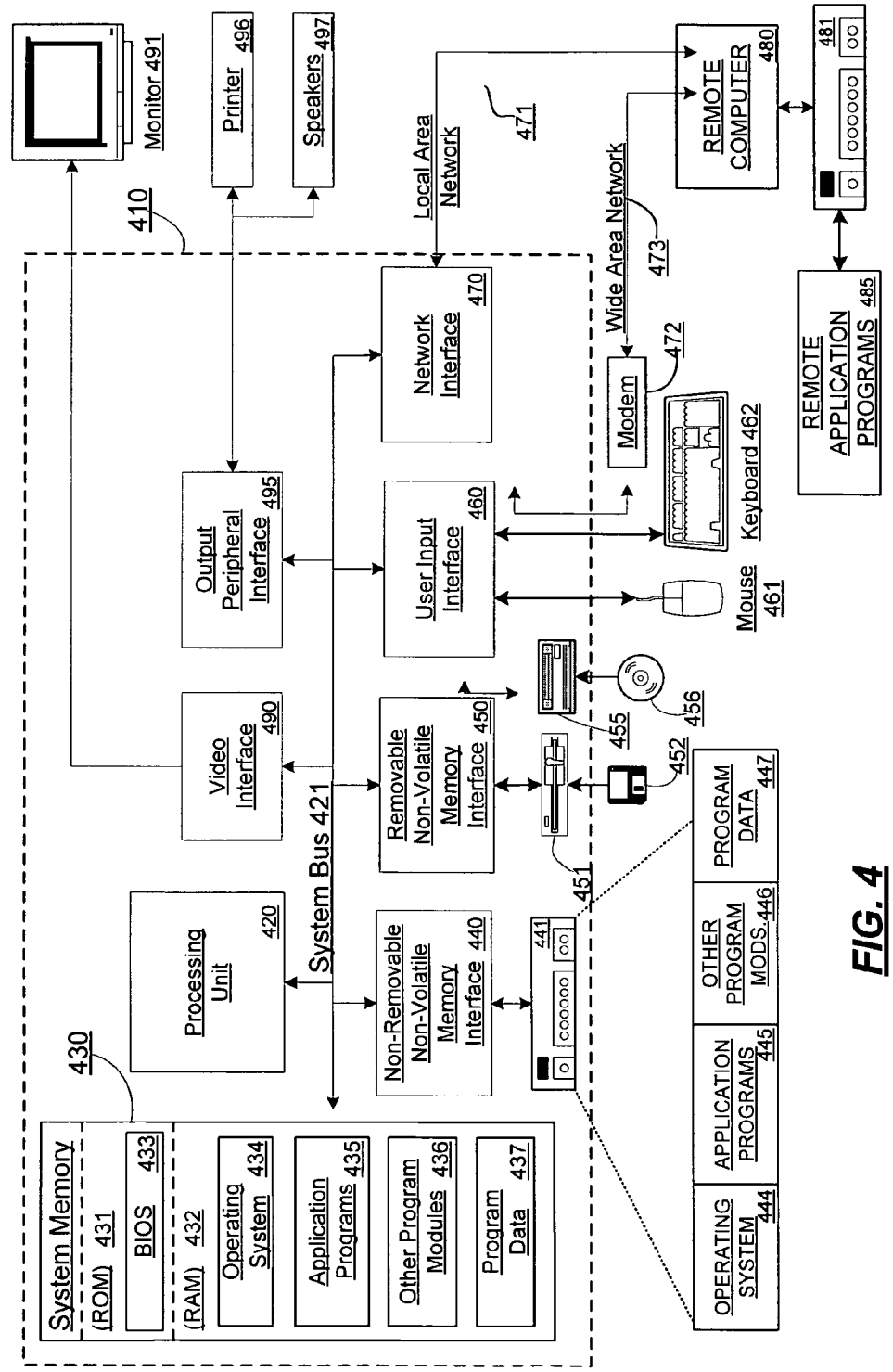
FIG. 4 is a block diagram of an example computing environment in which example embodiments and aspects may be implemented.

FIG. 4 shows an exemplary computing environment in which example embodiments and aspects may be implemented. The computing system environment 100 is only one example of a suitable computing environment and is not intended to suggest any limitation as to the scope of use or functionality. Neither should the computing environment 400 be interpreted as having any dependency or requirement relating to any one or combination of components illustrated in the exemplary operating environment 400.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system includes a general purpose computing device in the form of a computer 410. Components of computer 410 may include, but are not limited to, a processing unit 420, a system memory 430, and a system bus 421 that couples various system components including the system memory to the processing unit 420. The processing unit 420 may represent multiple logical processing units such as those supported on a multi-threaded processor. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 421 may also be implemented as a point-to-point connection, switching fabric, or the like, among the communicating devices.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 20 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for predictive caching in a videogame system, the method comprising:

executing a videogame in a videogame system, wherein the videogame system includes a cache and the videogame is stored on a videogame medium;

monitoring requests for file sections to the videogame medium;

submitting one or more of the file section requests to a predictive model, wherein the predictive model operates based on a variable level of prediction selected for the videogame such that particular file sections predicted by the predictive model can be varied for the videogame by the level of prediction selected for the videogame;

receiving one or more predictions of future file section requests related to the execution of the videogame from the predictive model;

retrieving one or more file sections predicted by the predictive model from the videogame medium;

placing the retrieved file sections in the cache;

assigning a counter to each file section stored in the cache;

incrementing a first counter assigned to a first file section each time the first file section is predicted by the predictive model;

decrementing the first counter each time the first file section is requested by the videogame; and as space in the cache is needed, replacing a file section with a lowest count.

2. The method of claim 1, wherein the videogame medium is an optical disk.

3. The method of claim 1, wherein the videogame medium is a remote storage medium.

4. The method of claim 1, wherein the cache is located in a low latency storage medium.

5. The method of claim 1, wherein each prediction of future file section requests includes a probability that the file section will be requested, and only retrieving predicted file sections with a probability greater than a threshold.

6. The method of claim 5, wherein the threshold is proportional to the size of the cache.

7. The method of claim 1, further comprising monitoring what file sections were actually requested from the videogame medium, and updating the predictive model to account for the file sections that were actually requested from the videogame medium.

8. The method of claim 1, wherein the predictive model is stored on a remote storage medium, the videogame medium, or in the videogame system.

9. A method comprising:

executing a videogame on a videogame system, wherein the videogame is stored on a storage medium;

monitoring and recording sequences of requests for data to the storage medium during execution of the videogame;

generating by the predictive model a likely sequence of future file section requests using the recorded sequences of requests for data to the storage medium;

retrieving one or more file sections predicted by a predictive model;

storing the retrieved file sections in cache;

assigning a counter to each file section stored in the cache;

incrementing a first counter assigned to a first file section each time the first file section is predicted by the predictive model;

decrementing the first counter each time the first file section is requested by the videogame; and as space in the cache is needed, replacing a file section with a lowest count.

10. The method of claim 9, wherein the storage medium comprises an optical disk, a remote storage medium, or a storage medium on the videogame system.

11. The method of claim 9, further comprising continuing to monitor and record the sequences of requests for data to an optical disk, and updating the generated predictive model to account for the recorded sequences of requested data.

12. The method of claim 9, wherein the predictive model is generated using Bayesian Probability models, or machine learning techniques.

13. The method of claim 9, further comprising collecting and monitoring the sequences of requests for data from a variety of users of the videogame, and updating the generated predictive model to account for the collected sequences of requests for data from the variety of users of the videogame.

14. A computer-readable storage medium with computer-executable instructions stored thereon for performing the method of:

executing a videogame in a videogame system;

monitoring requests for files related to the videogame;

submitting one or more of the file requests to a predictive model;

receiving from the predictive model one or more predictions of future file requests related to the execution of the videogame;

retrieving one or more files predicted by the predictive model; and storing the retrieved files in cache;

assigning a counter to each file section stored in the cache;

incrementing a first counter assigned to a first file section each time the first file section is predicted by the predictive model;

decrementing the first counter each time the first file section is requested by the videogame; and as space in the cache is needed, replacing a file section with a lowest count.

15. The computer-readable storage medium of claim 14, wherein the cache is located in a low latency storage medium.

16. The computer-readable storage medium of claim 14, wherein each prediction of future file requests includes a probability that the file will be requested, and only retrieving predicted files with a probability greater than a threshold.

17. The computer-readable storage medium of claim 16, wherein the threshold is proportional to the size of the cache.

18. The computer-readable storage medium of claim 14, further comprising monitoring what files were actually requested, and updating the predictive model to account for the files that were actually requested.

19. The computer-readable storage medium of claim 14, wherein the predictive model is stored on a remote storage medium, an optical disk, or in the videogame system.

* * * * *

UNITED STATES PATENT AND TRADEMARK OFFICE
CERTIFICATE OF CORRECTION

| | | |
|---|---|---|
| PATENT NO. | : 7,934,058 B2 | Page 1 of 1 |
| APPLICATION NO. | : 11/639717 | |
| DATED | : April 26, 2011 | |
| INVENTOR(S) | : Dax H. Hawkins et al. | |

It is certified that error appears in the above-identified patent and that said Letters Patent is hereby corrected as shown below:

In column 9, line 48, in Claim 9, delete "the" and insert -- a --, therefor.

In column 9, line 51, in Claim 9, delete "a" and insert -- the --, therefor.

Signed and Sealed this
Twenty-sixth Day of June, 2012

David J. Kappos
*Director of the United States Patent and Trademark Office*